(12) United States Patent
Baek et al.

(10) Patent No.: US 8,045,084 B2
(45) Date of Patent: Oct. 25, 2011

(54) DISPLAY DEVICE WHEREIN A FIRST REDUNDANCY CONDUCTIVE PATTERN IS FORMED WHERE THE SIGNAL LINE CROSSES THE REPAIR LINE AND MANUFACTURING METHOD THEREOF

(75) Inventors: Bum Ki Baek, Suwon-si (KR); Dong Il Son, Cheonan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1057 days.

(21) Appl. No.: 11/679,263

(22) Filed: Feb. 27, 2007

(65) Prior Publication Data
US 2007/0222727 A1 Sep. 27, 2007

(30) Foreign Application Priority Data

Mar. 8, 2006 (KR) .................. 10-2006-0021688

(51) Int. Cl.
*G02F 1/1333* (2006.01)
*G02F 1/13* (2006.01)
(52) U.S. Cl. .......................... 349/54; 349/192
(58) Field of Classification Search .................. 349/54, 349/55, 192
See application file for complete search history.

(56) References Cited

U.S. PATENT DOCUMENTS

| | | | | |
|---|---|---|---|---|
| 5,859,679 A | * | 1/1999 | Song | 349/54 |
| 2002/0030184 A1 | * | 3/2002 | Wu | 257/9 |
| 2002/0140894 A1 | * | 10/2002 | Morimoto | 349/156 |
| 2003/0007107 A1 | * | 1/2003 | Chae et al. | 349/43 |
| 2004/0124869 A1 | * | 7/2004 | Lee et al. | 324/770 |
| 2004/0141099 A1 | * | 7/2004 | Kim et al. | 349/43 |
| 2004/0169781 A1 | * | 9/2004 | Lee et al. | 349/54 |
| 2005/0116915 A1 | * | 6/2005 | Nakajima et al. | 345/93 |
| 2006/0186913 A1 | * | 8/2006 | Kim | 324/770 |

FOREIGN PATENT DOCUMENTS

| | | |
|---|---|---|
| JP | 2000-321599 | 11/2000 |
| JP | 2003-140164 | 5/2003 |
| KR | 2001-0068332 | 7/2001 |

* cited by examiner

*Primary Examiner* — Mark Robinson
*Assistant Examiner* — Dennis Y Kim
(74) *Attorney, Agent, or Firm* — F. Chau & Associates, LLC

(57) ABSTRACT

A display device includes a signal line formed on a substrate, a repair line formed on the substrate crossing and insulated from the signal line, and a first redundancy conductive pattern formed on a first region of the substrate where the signal line crosses the repair line, wherein the first redundancy conductive pattern is insulated from the signal line and the repair line.

33 Claims, 10 Drawing Sheets

DISPLAY DEVICE WHEREIN A FIRST REDUNDANCY CONDUCTIVE PATTERN IS FORMED WHERE THE SIGNAL LINE CROSSES THE REPAIR LINE AND MANUFACTURING METHOD THEREOF

CROSS-REFERENCE TO RELATED PATENT APPLICATION

This application claims priority to Korean Patent Application No. 2006-0021688, filed on Mar. 8, 2006 the contents of which are herein incorporated by reference in their entirety.

BACKGROUND OF THE INVENTION

1. Technical Field

The present disclosure relates to a display device and a method of manufacturing the display device.

2. Discussion of Related Art A liquid crystal display ("LCD") apparatus displays an image using the optical and electrical properties of liquid crystal material having dielectric anisotropy. An LCD apparatus includes liquid crystal material interposed between a color filter substrate and a thin film transistor ("TFT") array substrate. A common electrode is formed on the entire surface of the color filter substrate to provide common voltage. Pixel electrodes are formed on the TFT array substrate to receive data signals. A plurality of gate lines to control the TFTs and data lines to provide data signals to the TFTs are formed on the TFT array substrate.

The TFT array substrate may include repair lines to repair open-line defects. When a data line open-line defect is found in an inspection process, the open-line defect is repaired, for example, by laser welding, so that the data line and the repair line are electrically connected.

However, the repair success rate may vary depending on the metals used in the data line and the repair line. After the repair of the data line, current increase at the repaired portion of the data line causes progressing open-line defect over time.

SUMMARY OF THE INVENTION

In an exemplary embodiment of the present invention, a display includes; a signal line formed on a substrate; a repair line formed on the substrate, crossing and insulated from the signal line; and a first redundancy conductive pattern formed on a first region of the substrate where the signal line crosses the repair line, wherein the first redundancy conductive pattern is insulated from the signal line and the repair line.

The first redundancy conductive pattern may be an electrically-floating conductive pattern. When the signal line is repaired, the signal line and the repair line may be electrically connected to the first redundancy conductive pattern at the first region.

In an exemplary embodiment of the present invention, a method of manufacturing a display device includes: forming a signal line on a substrate; forming a repair line on the substrate crossing the signal line and insulated from the signal line; and forming a first redundancy conductive pattern insulated from the signal line and the repair line on a first region of the substrate where the signal line crosses the repair line.

BRIEF DESCRIPTION OF THE DRAWINGS

The present invention will become readily apparent to those of ordinary skill in the art when descriptions of exemplary embodiments thereof are read with reference to the accompanying drawings.

DESCRIPTION OF EXEMPLARY EMBODIMENTS

Figure 1:
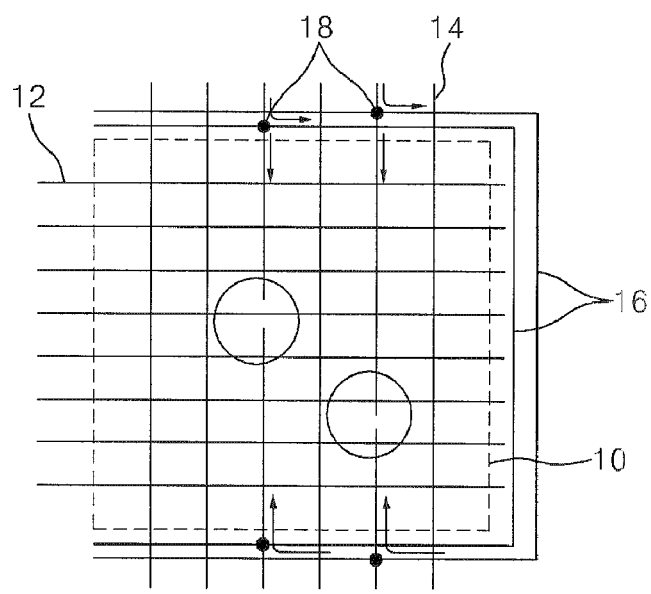
FIG. 1 is a plane view showing a display device according to an exemplary embodiment of the present invention.

It will be understood that when an element or layer is referred to as being "on", "connected to" or "coupled to" another element or layer, it can be directly on, connected or coupled to the other element or layer or intervening elements or layers may be present. Like reference numerals refer to similar or identical elements throughout the description of the figures.

Hereinafter, exemplary embodiments of the present invention will be described in detail with reference to the accompanying drawings.

FIG. 1 is a plane view showing a display device according to an exemplary embodiment of the present invention.

Referring to FIG. 1, image display part (10) includes a plurality of gate lines 12 and data lines 14 which are crossed with each other, and pixels which are formed at the intersections of the plurality gate lines 12 and the plurality of data lines 14 and independently driven by a Thin Film Transistor ("TFT"). The pixels are electrically charged by the voltage difference between a pixel electrode voltage and a common electrode voltage. The display device displays images by applying voltages to the pixel electrodes and common electrodes to generate an electric field in a liquid crystal layer which aligns the liquid crystal molecules of the liquid crystal layer to control the polarization of incident light. The display device realizes gray scale by adjusting the voltages between the pixel electrodes and the common electrode.

The plurality of gate lines 12 and the plurality of data lines 14 which are crossed with each other are insulated from each other by an insulating layer. To repair an open-line defect in data line 14, the plurality of repair lines 16 are formed in a configuration of a ring structure and crossed with the plurality of data lines 14 by a first insulating layer. For example, the plurality of repair lines 16 and the plurality of gate lines 12 are formed by using a first conductive layer. The plurality of data lines 14 are formed by using a second conductive layer and insulated from the first conductive layer by a first insulating layer.

When a data line 14 open-line defect is found in inspection process, laser is injected at the crossed portion between the data line 14 and the repair line 16 so that the data line 14 and the repair line 16 are welded. The repair line 16 is welded at the up and down part of the crossed portion between the data line 14 and the repair line 16 by laser. Thus, the data line 14 below data line open-line defect receives a data signal from a data driving circuit part passing through the repair line 16.

A display device according to an exemplary embodiment of the present invention includes at least one of a redundancy conductive pattern and increasing laser welding points, and may increase success rate of laser welding and may prevent a progressing open-line defect. Hereinafter, a crossed portion between the data line 14 and the repair line 16, according to exemplary embodiments of the present invention will be described with reference to FIGS. 2 through 16.

Figure 2:
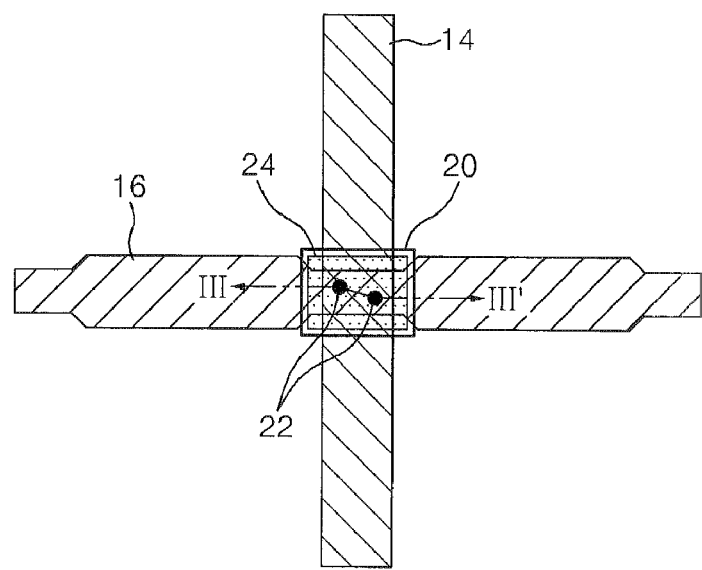
FIG. 2 is a plane view of repairing portion according to an exemplary embodiment of the present invention.
Figure 3A:
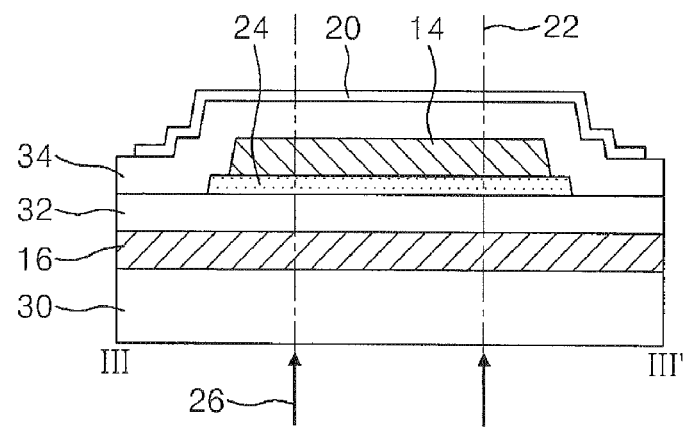
FIGS. 3A and 3B are cross-sectional views taken along line III-III' of FIG. 2.
Figure 3B:
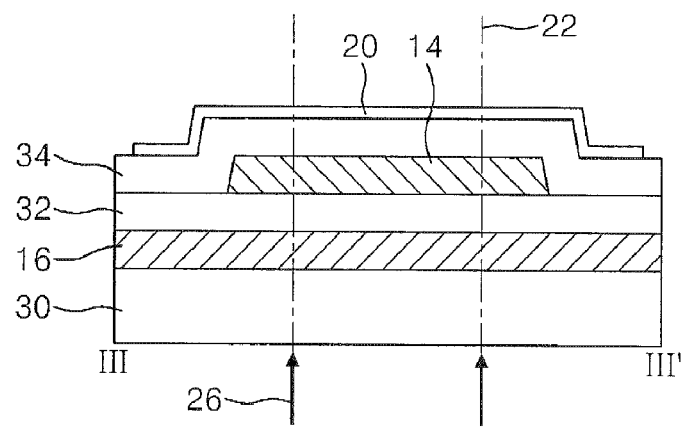
Figure 3C:
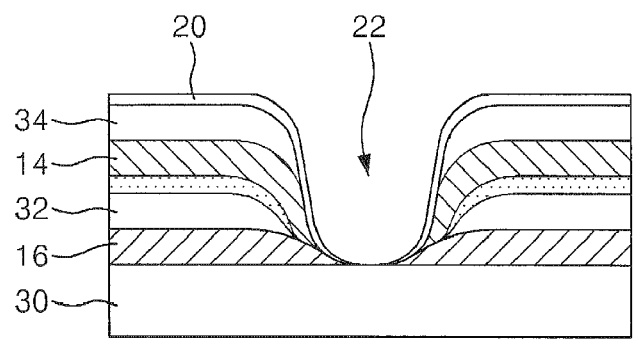
FIG. 3C is a cross-sectional view of FIG. 2 after being repaired all according to an exemplary embodiment of the present invention.

FIG. 2 is a plane view of repairing portion according to an exemplary embodiment of the present invention, and FIGS. 3A and 3B are cross-sectional views taken along line III-III' of FIG. 2. FIG. 3C is a cross-sectional view of FIG. 2 after being repaired according to an exemplary embodiment of the present invention. With reference of FIG. 2 through FIG. 3B, a data line 14 and a repair line 16 are crossed and insulated from each other by a first insulating layer 32. A redundancy conductive pattern 20 is formed at the crossed portion between the data line 14 and the repair line 16, and insulated from the data line 14 and the repair line 16 by a second insulating layer 34.

The repair line 16 is formed at the same time when the gate line 12 in image display part 10 are patterned and formed by using a first conductive metal layer. For example, the repair line 16 has a narrow width portion that is overlapped at the crossed portion between the data line 14 and the repair line 16 to decrease parasitic capacitance caused by the overlap between the data line 14 and the repair line 16. The gate metal layer may be Molybdenum, Aluminum, Chrome or alloy of them, and formed in one layer or over double layer. For example, the gate metal layer may be double layer of Aluminum and Molybdenum. A gate insulating layer 32 as a first insulating layer is formed on a insulating substrate (30) having a repair line 16. The gate insulating layer 32 may be inorganic material such as Silicon Oxide ("SiOx") and Silicon Nitride ("SiNx").

The data line 14 is formed on the gate insulating layer 32 by patterning source/drain metal layer, second conductive layer. The data line 14 is crossed with the repair line 16 and insulated from the repair line 16. The source/drain metal layer may include Molybdenum, Aluminum, Chrome and their alloy, and may be formed in one or more layers. For example, source/drain metal layer may be formed in Molybdenum/Aluminum/Molybdenum, triple layer. Additionally, a semiconductor pattern 24 may be formed at the crossed portion between the repair line 16 and the data line 14 before forming the data line 14 to decrease parasitic capacitance by increasing the distance between the data line 14 and the repair line 16. As shown in FIG. 3B, the semiconductor pattern 24 may be omitted.

The semiconductor pattern 24 may be formed by patterning Amorphous Silicon when a channel of thin film transistor in the image display part 10 is patterned. A protection layer 34 as a second insulating layer may be formed on the gate insulation layer 32 where the data line 14 is formed on. The protection layer 34 may comprise an inorganic insulation material, such as for example, Silicon Oxide (SiOx) and Silicon Nitride (SiNx), or organic insulating material can be used. A redundancy conductive pattern 20 is formed on the protection layer 34 at the crossed portion between the data line 14 and the repair line 16. For example, when a pixel electrode in the image display part 10 is formed, the redundancy conductive pattern 20 as a third conductive layer may be formed by patterning a transparent conductive layer wherein the redundancy conductive pattern 20 covers the crossed portion between the data line 14 and the repair line 16. The transparent conductive layer may comprise ITO (Indium Tin Oxide), TO (Tin Oxide), IZO (Indium Zinc Oxide) and/or ITZO. In the case of trans-reflective mode that has a reflective electrode in image display part 10, the redundancy conductive pattern 20 may be formed by patterning a reflective metal layer when the reflective electrode is formed. For example, the redundancy conductive pattern 20 may be formed as a double layer such as a transparent conductive layer/reflective metal layer. To decrease parasitic capacitance, the redundancy conductive pattern 20 may be an electrically-floating conductive pattern.

When the data line 14 is repaired, the redundancy conductive pattern 20 is melted with the repair line 16 and the data line 14 and the redundancy conductive pattern 20 is electrically connected to the data line 14 and the repair line 16. The redundancy conductive pattern 20 may reinforce the electric contact between the data line 14 and the repair line 16 at welding points 22 as shown in FIG. 3C. With reference to FIGS. 3B and 3C, the data line 14 and the repair line 16 are electrically connected through the redundancy conductive pattern 10, for example, by laser 26 welding, as a double electric contact.

In an exemplary embodiment of the present invention, the success rate of repairing an open-line defect in the data line 14 may be increased and a progressing open-line defect may be prevented by including the redundancy conductive pattern 20.

Figure 4:
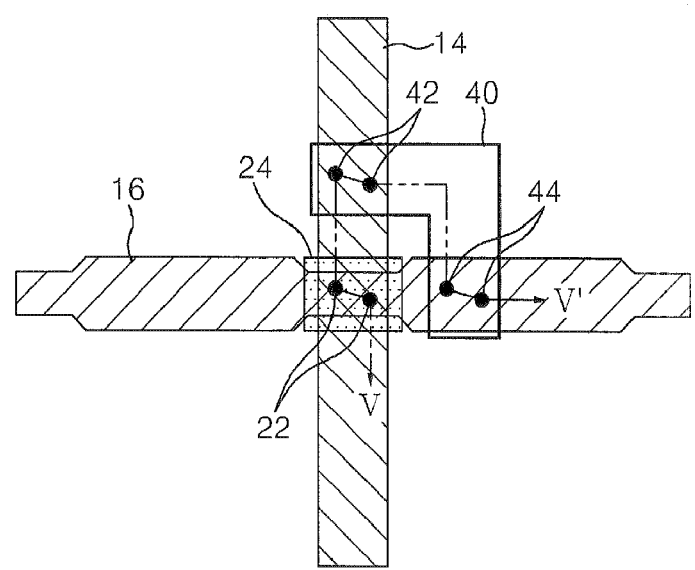
FIG. 4 is a plane view of repairing portion according to an exemplary embodiment of the present invention.
Figure 5:
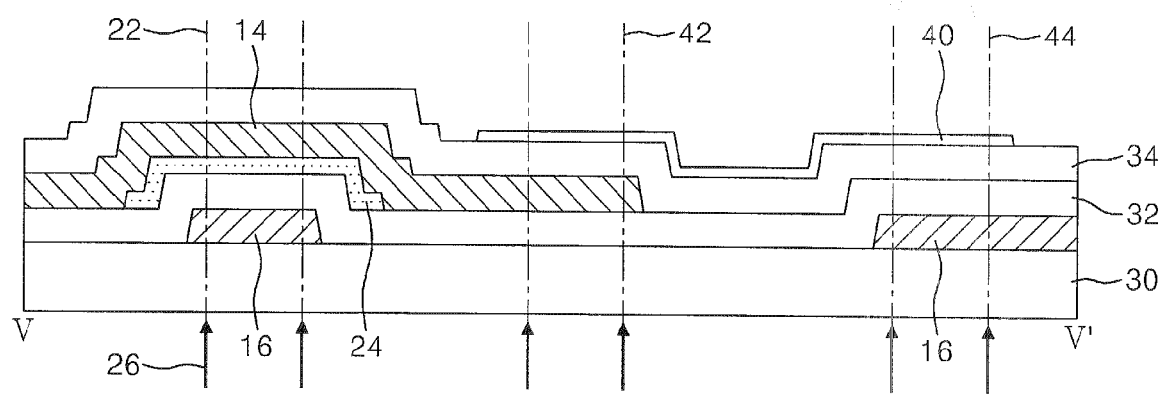
FIG. 5 is a cross-sectional view taken along line V-V' of FIG. 4.

FIG. 4 is a plane view of repairing portion according to an exemplary embodiment of the present invention, and FIG. 5 is a cross-sectional view taken along line V-V' of FIG. 4.

With reference to FIGS. 4 and 5, a redundancy conductive pattern 40 is separated from the crossed portion between a data line 14 and a repair line 16. A first part of the redundancy conductive pattern 40 is overlapped with the data line 14 at different portion from the crossed portion between the data line 14 and the repair line 16, and a second part of the redundancy conductive pattern 40 is overlapped with the repair line 16 at different portion from the crossed portion between the data line 14 and the repair line 16. The redundancy conductive pattern 40 is overlapped with the data line 14 through a protection layer 34 and overlapped with the repair line 16 through the protection layer 34 and a gate insulating layer 32. The redundancy conductive pattern 40 is formed on the protection layer 32 by using at least one of a transparent conductive layer and a reflective metal layer to form an electrically-floating conductive pattern, and an increase of parasitic capacitance caused by the redundancy conductive pattern may be prevented.

When the data line 14 is repaired, the data line 14 is electrically connected to the repair line 16 at the crossed portion between the data line 14 and the repair line 16, for example by laser welding, via welding points 22. The data line 14 may be electrically connected to the repair line via the redundancy conductive pattern 40 via welding points 42 at the overlapped portion between the data line 14 and the redundancy conductive pattern 40 and welding points 44 at the overlapped portion between the repair line 16 and the redundancy conductive pattern 40. In an exemplary embodiment of the present invention, the data line 14 is electrically connected to the repair line 16 via the redundancy conductive pattern 40 at the plurality welding points 22, 42, 44, and the success rate of repairing the data line 14 may be increased. The electric current provided to the repair line 16 from the data line 14 may be distributed to the plurality of welding points 22, 42, 44 and the amount of electric current at each welding point may be decreased and the progressing open-line defect may be prevented.

Figure 6:
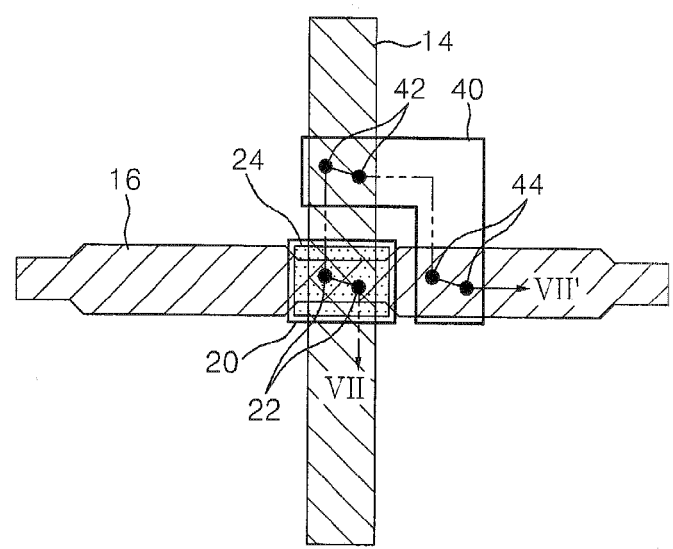
FIG. 6 is a plane view of repairing portion according to an exemplary embodiment of the present invention.
Figure 7:
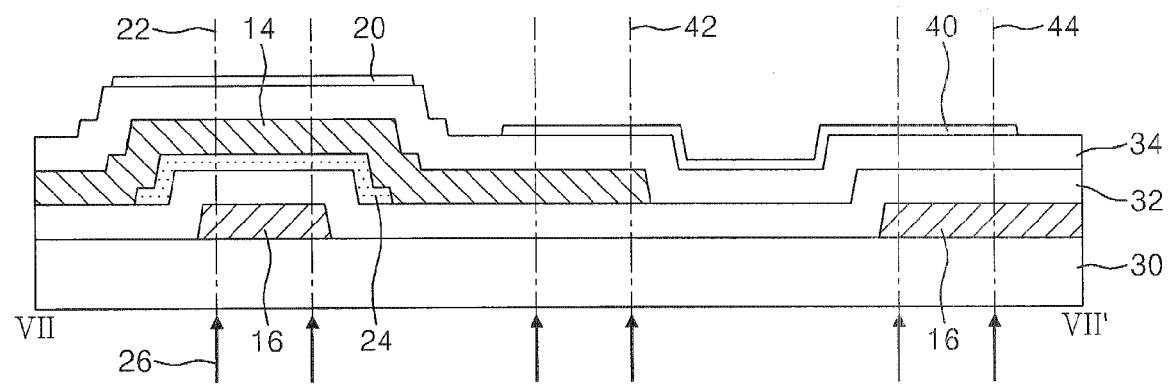
FIG. 7 is a cross-sectional view taken along line VII-VII' of FIG. 6.

FIG. 6 is a plane view of repairing portion according to an exemplary embodiment of the present invention, and FIG. 7 is a cross-sectional view taken along line VII-VII' of FIG. 6.

With reference to FIGS. 6 and 7, a first redundancy conductive pattern 20 is overlapped at the crossed portion between the data line 14 and the repair line 16. One part of a second redundancy conductive pattern 40 is overlapped with the data line 14 at different portion from the crossed portion between the data line 14 and the repair line 16, and another part of a second redundancy conductive pattern 40 is overlapped with the repair line 16 at different portion form the crossed portion between the data line 14 and the repair line 16. The first and second redundancy conductive pattern 20, 40 is formed on a protection layer 34 using a transparent conductive layer and/or a reflective metal layer, and may be electrically-floating, and an increase in the parasitic capacitance caused by the first and second redundancy conductive pattern 20, 40 may be prevented. The first redundancy conductive pattern 20 is overlapped with the crossed portion between the data line 14 and the repair line 16 through the protection layer 34. One part of the second redundancy conductive pattern 40 is overlapped with the data line 14 through the protection layer 34 at different portion from the crossed portion between the data line and the repair line, and another part of the second redundancy conductive pattern 40 is overlapped with the repair line 16 through the protection layer 34 and a gate insulating layer 32 at different portion from the crossed portion between the data line 14 and the repair line 16.

When the data line 14 is repaired, the data line 14 and the repair line 16 are electrically connected to the first redundancy conductive pattern 20 at the crossed portion between the data line 14 and the repair line 16, for example, by laser welding, via welding points 22. The data line 14 may be electrically connected to the repair line through the second redundancy conductive pattern 40 via the welding points 42 at the overlapped portion between the data line 14 and the second redundancy conductive pattern 40, and welding points 44 at the overlapped portion between the repair line 16 and the second redundancy conductive pattern 40. In an exemplary embodiment of the present invention, the data line 14 is electrically connected to the repair line 16 via the first and second redundancy conductive pattern 20, 40 at the plurality welding points 22, 42, 44, and the success rate of repairing the data line 14 may be increased. The electric current provided to the repair line 16 from the data line 14 is distributed to the plurality of welding points 22, 42, 44 and the amount of electric current at each welding point is decreased and the progressing open-line defect may be prevented.

Figure 8:
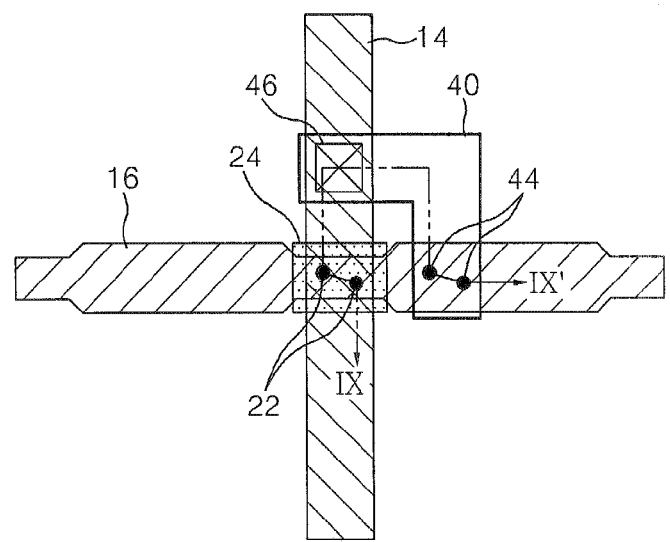
FIG. 8 is a plane view of repairing portion according to an exemplary embodiment of the present invention.
Figure 9:
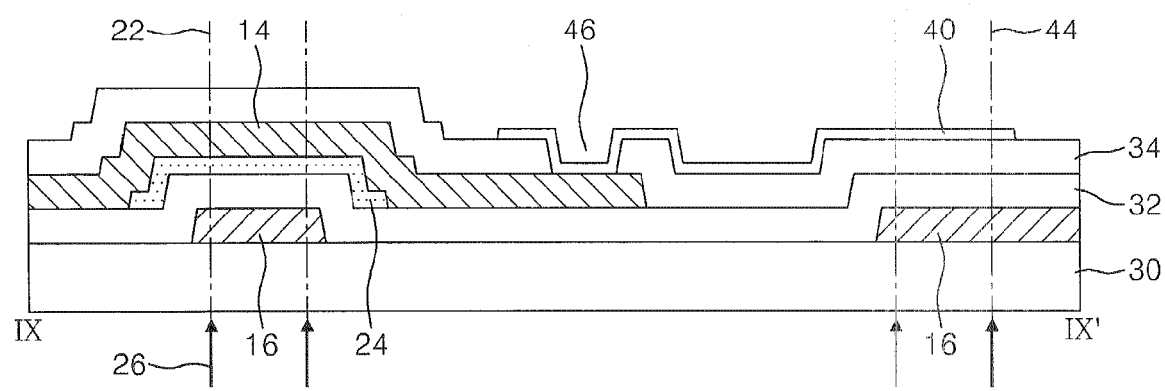
FIG. 9 is a cross-sectional view taken along line IX-IX' of FIG. 8.
Figure 10:
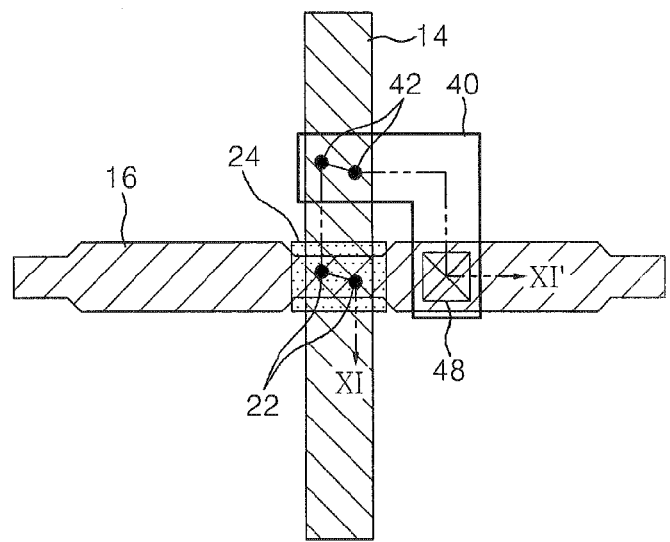
FIG. 10 is a plane view of repairing portion according to an exemplary embodiment of the present invention.

FIG. 8 is a plane view of repairing portion according to an exemplary embodiment of the present invention, and FIG. 9 is a cross-sectional view taken along line IX-IX' of FIG. 8. FIG. 10 is a plane view of repairing portion according to an exemplary embodiment of the present invention, and FIG. 11 is a cross-sectional view taken along line XI-XI' of FIG. 10.

Figure 11:
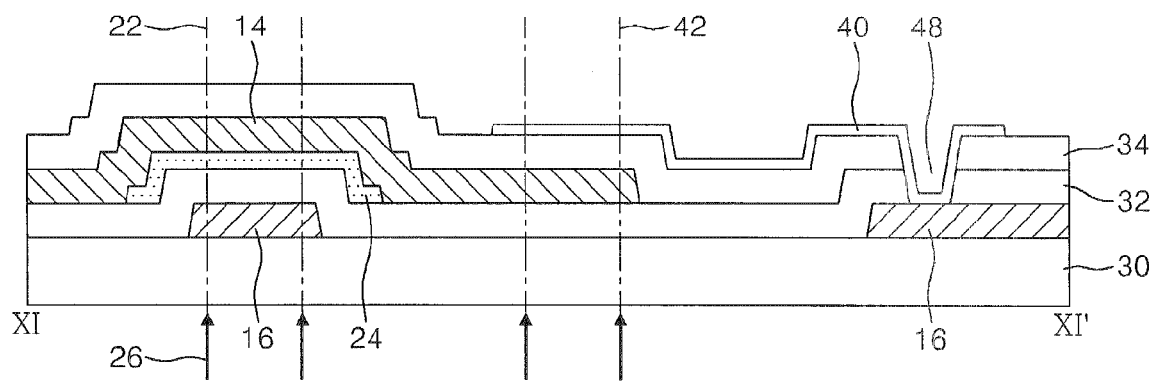
FIG. 11 is a cross-sectional view taken along line XI-XI' of FIG. 10.

With reference to FIG. 8 through FIG. 11, a part of a redundancy conductive pattern 40 is insulated from and overlapped with one of the data line 14 and the repair line 16 at different portion from the crossed portion between the data line 14 and the repair line 16, and another part of a redundancy conductive pattern is electrically connected to one of the data line 14 and the repair 16. As shown in FIGS. 8 and 9, one part of the redundancy conductive pattern 40 is overlapped with the repair line 16 through the protection layer 34 and the gate insulating layer 32, and another part of the redundancy conductive pattern 40 is electrically connected to the data line 14 via a contact hole 46 that penetrates the protection layer 34. As shown in FIGS. 10 and 11, one part of the redundancy conductive pattern 40 is overlapped with the data line 14 through the protection layer 34, and another part of the redundancy conductive pattern 40 is electrically connected to the repair line 16 via a contact hole 48 that penetrates the protection layer 34 and the gate insulating layer 32. One part of the redundancy conductive pattern 40 may be electrically floating and parasitic capacitance caused by the redundancy conductive pattern 40 may not be increased. The redundancy conductive pattern 40 may be formed on the protection layer 34 by using a transparent conductive layer and/or a reflective metal layer.

When the data line 14 is repaired, the data line 14 is electrically connected to the repair line 16 at the crossed portion between the data line 14 and the repair line 16 via welding points 22. The data line 14 may be electrically connected to the repair line 16 via the redundancy conductive pattern 40 via welding points 42 at the overlapped portion between the data line 14, as shown in FIGS. 10 and 11. The data line 14 may be electrically connected to the repair line 16 via the redundancy conductive pattern 40 and welding points 44 at the overlapped portion between the repair line 16 and the redundancy conductive pattern 40, as shown in FIGS. 8 and 9. A redundancy conductive pattern 20, as shown in FIGS. 6 and 7, may be formed at the crossed portion between the data line 14 and the repair line 16. In an exemplary embodiment of the present invention, the data line 14 is electrically connected to the repair line 16 via the redundancy conductive pattern 40 at the plurality welding points 22, 42, 44 and contact holes 46, 48 and the success rate of repairing the data line 14 may be increased. The electric current provided to the repair line 16 from the data line 14 is distributed to the plurality of welding points 22, 42 or 22, 44 and the amount of electric current at each welding point is decreased and the progressing open-line defect may be prevented. The number of laser welding may be decreased by using contact holes 46, 48.

Figure 12A:
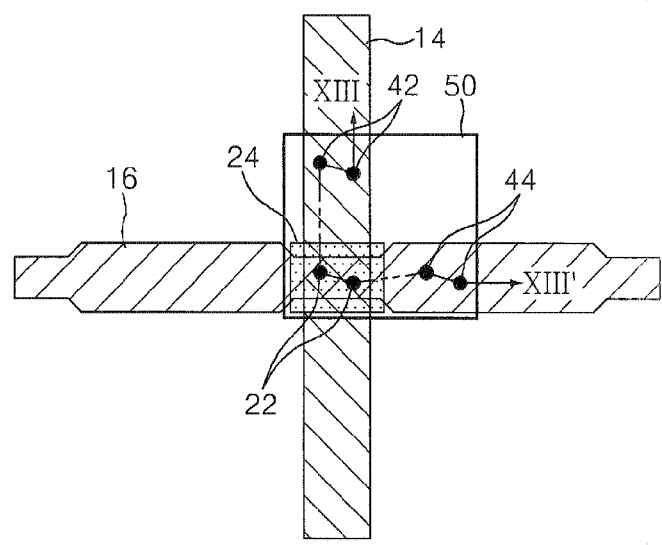
FIGS. 12A and 12B are plane views of repairing portion according to an exemplary embodiment of the present invention.
Figure 12B:
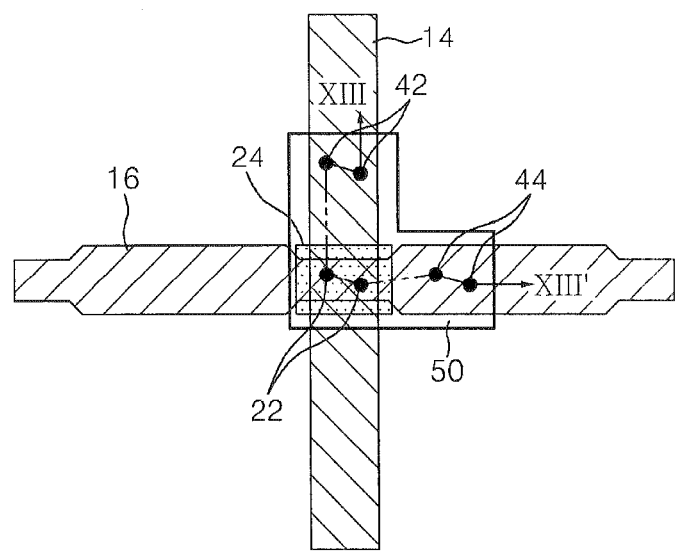
Figure 13:
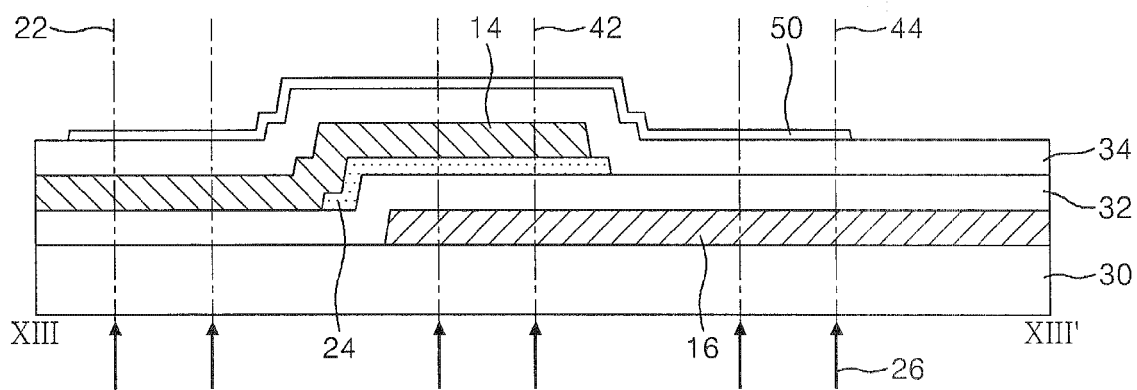
FIG. 13 is a cross-sectional view taken along line XIII-XIII' of FIG. 12.

FIGS. 12A and 12B are plane views of repairing portion according to an exemplary embodiment of the present invention. FIG. 13 is a cross-sectional view taken along line XIII-XIII' of FIG. 12.

With reference to FIGS. 12 and 13, the redundancy conductive pattern 50 is overlapped with the crossed portion between the data line 14 and the repair line 16>and extends along the data line 14 and along the repair line 16 and the redundancy conductive pattern 50 is overlapped with the data line 14 or the repair line 16 at different portion from the crossed portion between the data line 14 and the repair line 16. That is, the redundancy conductive pattern 50 is overlapped with the crossed portion between the data line 14 and the repair line 16 through the protection layer 34, and one part of the redundancy conductive pattern 50 is extended and overlapped with the data 14 through the protection layer 34 and another part of redundancy conductive pattern 50 is extended and overlapped with the repair line 16 through the protection layer 34 and the gate insulating layer 32.

The redundancy conductive pattern 50 may have square shape, as shown in FIG. 12A, or may have "L" shape, as shown in FIG. 12B. The structure of the redundancy conductive pattern 50 shown in FIG. 12A may be same to the integrated structure of the first and redundancy conductive pattern 20, 40 shown in FIGS. 6 and 7. The redundancy conductive pattern 50 may be formed on the protection layer by using a transparent conductive layer and/or reflective metal layer. The redundancy conductive pattern 50 may be electrically-floating and an increase in the parasitic capacitance caused by the redundancy conductive pattern 50 may be prevented.

When the data line 14 is repaired, the data line 14 and the repair line 16 are electrically connected to the redundancy conductive pattern 50 at the crossed portion between the data line 14 and the repair line 16>for example, by laser 26 welding, via welding points 22. In addition, the data line 14 may be electrically connected to the redundancy conductive pattern 50 at the overlapped portion between the data line 14 and the redundancy conductive pattern 50, for example, by laser 26 welding, via welding point 42. In addition, the repair line 16 may be electrically connected to the redundancy conductive pattern 50 at the overlapped portion between the repair line 16 and the redundancy conductive pattern 50, for example, by laser 26 welding, via welding point 44.

In an exemplary embodiment of the present invention, the data line 14 and the repair line 16 are electrically connected to each other through the redundancy conductive pattern 50 and the multiple welding points 22, 42, 44, and the success rate of repairing the data line 14 may increased and the amount of electric current at each welding point 22, 42, 44 may be decreased because of current distribution and the progressing open-line defect at each welding point 22, 42, 44 may be prevented.

Figure 14A:
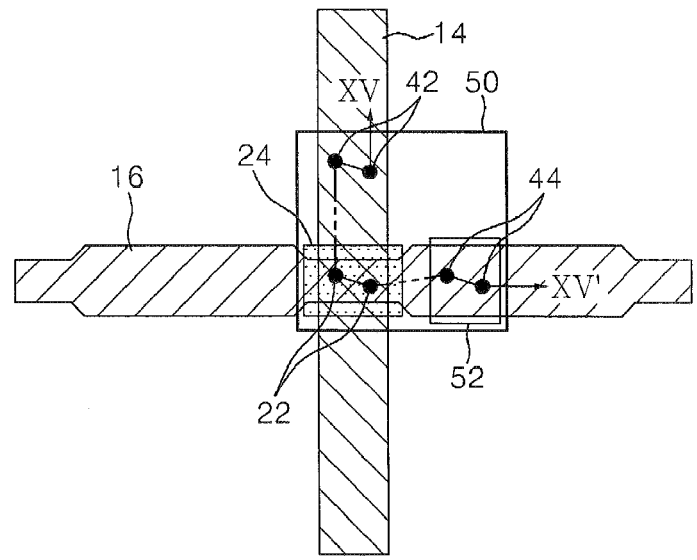
FIGS. 14A and 14B are plane views of repairing portion according to an exemplary embodiment of the present invention.

FIGS. 14A and 148 are plane views of a repairing portion according to an exemplary embodiment of the present invention. FIG. 15 is a cross-sectional view taken along line XV-XV' of FIG. 14.

Figure 14B:
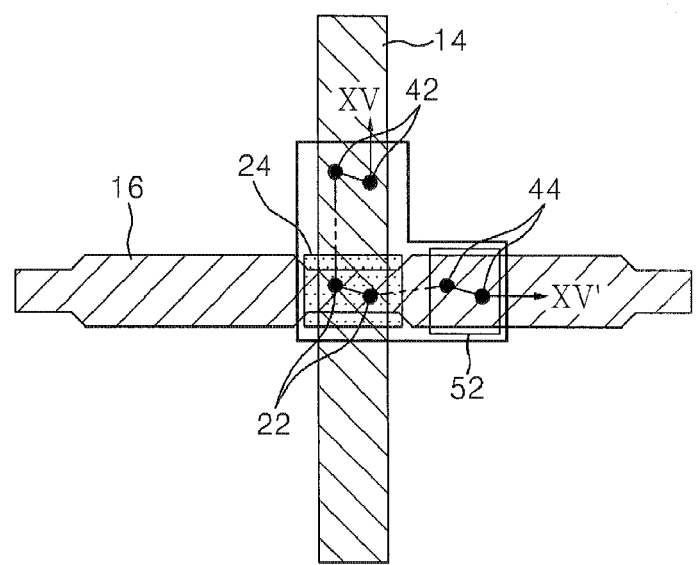
Figure 15:
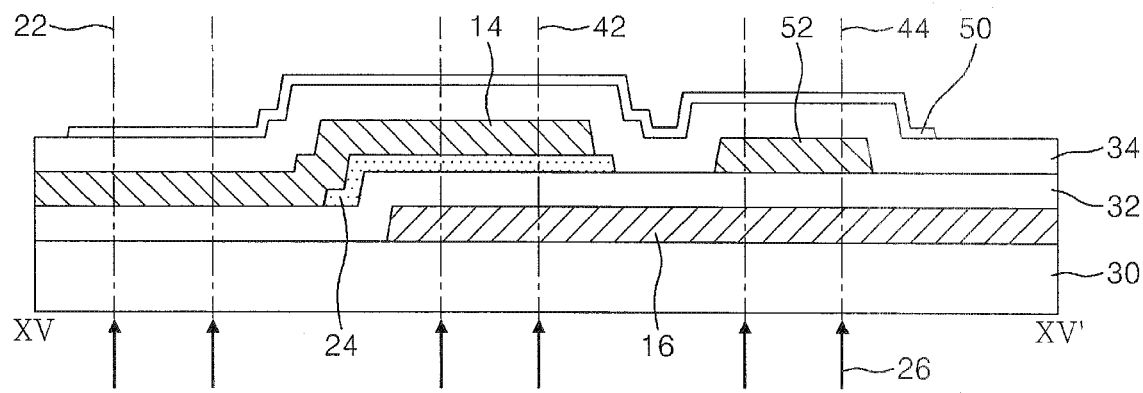
FIG. 15 is a cross-sectional view taken along line XV-XV' of FIG. 14.

The repair portion of the data line 14 shown in FIGS. 14 and 15 is similar to the repair portion of the data line 14 shown in FIGS. 12 and 13 except that the second redundancy conductive pattern 52 is formed between the first redundancy conductive pattern 50 and the repair line 16. The second redundancy conductive pattern 52 is formed on the gate insulating layer 32 with the second conductive layer used in the data line 14, that is, source/drain metal layer. The second redundancy conductive pattern 52 is electrically connected to the repair line 16 through the first redundancy conductive pattern 50, for example, by laser 26 welding, via the welding points 44, and the connection between the redundancy conductive pattern 50 and the repair line 16 at the welding points 44 may be reinforced. The second redundancy conductive pattern 52 may be applied in the repair portion of the data line 14 shown in FIG. 4 to FIG. 9.

Figure 16:
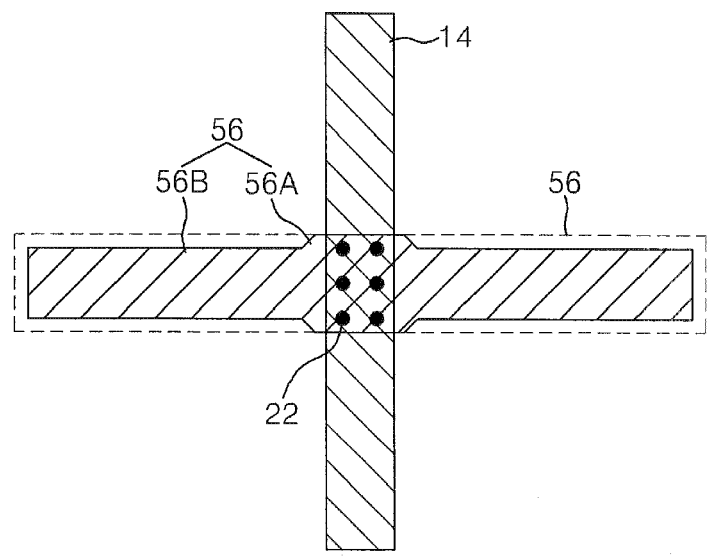
FIG. 16 is a plane view of repairing portion according to an exemplary embodiment of the present invention.

FIG. 16 is a plane view of a repairing portion according to an exemplary embodiment of the present invention.

With reference to FIG. 16, the area of the crossed portion between the data line 14 and the data line 56 is increased to include multiple welding points 62. For example, the area of the crossed portion may be increased by increasing the width of the repair line 56 at the crossed portion. For example, the width of the repair line 56 may be increased at the crossed portion to be able to include at least 4 welding points 62. The area of the crossed portion may be increased by increasing the width of the whole repair line 56.

When the data line 14 is repaired, the data line 14 is electrically connected to the repair line 56 via the multiple welding points 62, such as for example, 6 welding points, and the success rate of repairing the data line 14 may be increased and the amount of electric current at each welding point 62 may be decreased and the progressing open-line defect at each welding point 62 may be prevented. In an exemplary embodiment of the present invention, the width of the data line 14 is increased to enlarge the crossed portion between the data line 14 and the repair line 56 such that the crossed portion includes at least 4 welding points 62. It is to be understood that the modification of the repair portion shown in FIG. 2 through FIG. 15 may be applied to the repair portion shown in FIG. 16.

The above-described structures and methods to repair the data line shown in FIG. 2 through FIG. 16 may be applied to repair the gate line or the storage line.

Although the exemplary embodiments of the present invention have been described in detail with reference to the accompanying drawings for the purpose of illustration, it is to be understood that inventive processes and apparatus should not be construed as limited thereby. It will be readily apparent to those of ordinary skill in the art that various modifications to the foregoing exemplary embodiments can be made without departing from the scope of the invention as defined by the appended claims, with equivalents of the claims to be included therein.

What is claimed is:

1. A display device comprising:
    a signal line formed on a substrate comprising an image display part which displays an image and a non-image display part adjacent to the image display part;
    a repair line formed on the substrate crossing and insulated from the signal line, the repair line having a width in an area where the repair line crosses the signal line narrower than a width in an area where the repair line does not cross the signal line; and
    a first redundancy conductive pattern formed on a first region of the substrate and insulated from the signal line and the repair line, the first redundancy conductive pattern disposed on a different layer from the repair line while interposing an insulating layer between the first redundancy conductive pattern and the repair line,
    wherein the first redundancy conductive pattern comprises a metal material, a portion of the first redundancy conductive pattern is overlapped with at least one of the signal line and the repair line and when the signal line is repaired, the repair line is connected with the signal line in the non-image display part, and
    wherein the first redundancy conductive pattern is formed where the signal line crosses the repair line.

2. The display device of claim 1, wherein the first redundancy conductive pattern is an electrically-floating conductive pattern.

3. The display device of claim 1, wherein when the signal line is repaired, the signal line and the repair line are electrically connected to the first redundancy conductive pattern at the first region.

4. The display device of claim 1, further comprising a second redundancy conductive pattern including a first part that is overlapped with the signal line on a second region of the substrate different from the first region, wherein the first part is insulated from the signal line, and a second part that is overlapped with the repair line at a third region of the substrate different from the first region, wherein the second part is insulated from the repair line.

5. The display device of claim 4, wherein the second redundancy conductive pattern is one of separated from the first redundancy conductive pattern or integrated with the first redundancy conductive pattern.

6. The display device of claim 5, further comprising at least two insulating layers formed at the crossed portion between the repair line and the second redundancy conductive pattern; and
a third redundancy conductive pattern formed between the insulating layers and overlapped with the second redundancy conductive pattern.

7. The display device of claim 5, wherein the signal line and the repair line include a metal layer comprising Molybdenum, and wherein the first and second redundancy conductive patterns are formed by patterning at least one of a transparent conductive layer or a metal layer.

8. The display device of claim 7, wherein the signal line and the repair line include a metal layer comprising Molybdenum and Aluminum, and wherein the first and second redundancy conductive patterns are formed by patterning at least one of a transparent conductive layer or a metal layer.

9. The display device of claim 4, wherein when the signal line is repaired, the signal line and the repair line are electrically connected to the first redundancy conductive pattern at the first region, wherein the signal line is electrically connected to the second redundancy conductive pattern at the second region, and wherein the repair line is electrically connected to the second redundancy conductive pattern at the third region.

10. The display device of claim 4, wherein the signal line is electrically connected to the second redundancy conductive pattern through a contact hole.

11. The display device of claim 10, wherein when the signal line is repaired, the signal line and the repair line are electrically connected to the first redundancy conductive pattern at the first region and the signal line is electrically connected to the second redundancy conductive pattern at the second region.

12. The display device of claim 4, wherein the repair line is electrically connected to the second redundancy conductive pattern through a contact hole.

13. The display device of claim 12, wherein when the signal line is repaired, the signal line and the repair line are electrically connected to the first redundancy conductive pattern at the first region and the repair line is electrically connected to the second redundancy conductive pattern at the third region.

14. The display device of claim 1, wherein the first redundancy conductive pattern extends along the signal line from the first region, and the first redundancy conductive pattern is overlapped with and insulated from the signal line, and wherein the first redundancy conductive pattern extends along the repair line from the first region, and the first redundancy conductive pattern is overlapped with and insulated from the repair line.

15. The display device of claim 1, wherein the signal line is at least one of a gate line, a data line or a storage line.

16. The display device of claim 15, further comprising a semiconductor pattern formed at the first region.

17. The display device of claim 1, wherein the signal line and the repair line include a metal layer comprising Molybdenum.

18. The display device of claim 17, wherein the metal layer further comprises Aluminum.

19. A method of manufacturing a display device comprising:
forming a signal line on a substrate comprising an image display part which displays an image and a non-image display part adjacent to the image display part;
forming a repair line on the substrate crossing the signal line and insulated from the signal line, the repair line being connected with the signal line in the non-image display part when the signal line is repaired;
forming an insulating layer on the substrate including an area where the signal line is formed;
forming a metal layer on the insulating layer; and
patterning the metal layer to form a first redundancy conductive pattern on the insulating layer, the first redundancy conductive pattern insulated from the signal line and the repair line on a first region of the substrate so that a portion of the first redundancy conductive pattern is overlapped with at least one of the signal line and the repair line, wherein the repair line has a width in an area where the repair line crosses the signal line narrower than a width in an area where the repair line does not cross the signal line, and
wherein the first redundancy conductive pattern is formed where the signal line crosses the repair line.

20. The method of claim 19, wherein said first redundancy conductive pattern is floating.

21. The method of claim 19, further comprising:
repairing the signal line whereby the signal line and the repair line are electrically connected to the first redundancy conductive pattern at the first region.

22. The method of claim 19, further comprising:
forming a second redundancy conductive pattern which includes one part that is overlapped with the signal line at different portion from the crossed portion between signal line and the repair line and is insulated from the signal line, and another part that is overlapped with the repair line at different portion from the crossed portion between the signal line and the repair line and is insulated from the repair line.

23. The method of claim 22, wherein the second redundancy conductive pattern is formed being one of separated from the first redundancy conductive pattern or integrated with the first redundancy conductive pattern.

24. The method of claim 23, wherein the repair line comprises a double metal layer including Aluminum/Molybdenum, wherein the signal line comprises a triple metal layer including Molybdenum/Aluminum/Molybdenum, and wherein the first and second redundancy conductive patterns are formed by patterning at least one of a transparent conductive layer or a metal layer.

25. The method of claim 22, further comprising:
repairing the signal line so that the signal line and the repair line are electrically connected to the first redundancy conductive pattern, and the signal line is electrically connected to the second redundancy conductive pattern at the overlap portion between the signal line and the second redundancy conductive pattern, and the repair line is electrically connected to the second redundancy conductive pattern at the overlap portion between the repair line and the second redundancy conductive pattern.

26. The method of claim 22, further comprising:
forming at least one contact hole which electrically connects the signal line to the second redundancy conductive pattern.

27. The method of claim 22, further comprising:
forming at least one contact hole which electrically connects the signal line or the repair line to the second redundancy conductive pattern.

28. The method of claim 22, further comprising:
forming at least two insulating layers at the overlapped portion between the repair line and the second redundancy conductive pattern;
forming a third redundancy conductive pattern between the insulating layers and overlapped with the second redundancy conductive pattern.

29. The method of claim 19, wherein the first redundancy conductive pattern extends along the signal line from the first region, and the first redundancy conductive pattern is overlapped with and insulated from the signal line, and wherein the first redundancy conductive pattern extends along the repair line from the first region, and the first redundancy conductive pattern is overlapped with and insulated from the repair line.

30. The method of claim 19, further comprising:
forming a semiconductor pattern overlapped with the first region.

31. The method of claim 19, wherein the repair line comprises a double metal layer of Aluminum/Molybdenum and the signal line comprises a triple metal layer of Molybdenum/Aluminum/Molybdenum.

32. A display device comprising:
a signal line formed on a substrate comprising an image display part which displays an image and a non-image display part adjacent to the image display part;
a repair line formed on the substrate crossing and insulated from the signal line, the repair line having a width in an area where the repair line crosses the signal line narrower than a width in an area where the repair line does not cross the signal line; and
a first redundancy conductive pattern formed on a first region of the substrate and insulated from the signal line and the repair line, the first redundancy conductive pattern disposed on a different layer from the repair line while interposing an insulating layer between the first redundancy conductive pattern and the repair line,
wherein the first redundancy conductive pattern comprises a metal material, a portion of the first redundancy conductive pattern is overlapped with at least one of the signal line and the repair line and when the signal line is repaired, the repair line is connected with the signal line in the non-image display part, and
wherein when the signal line is repaired, the signal line and the repair line are electrically connected to the first redundancy conductive pattern at the first region.

33. A method of manufacturing a display device comprising:
forming a signal line on a substrate comprising an image display part which displays an image and a non-image display part adjacent to the image display part;
forming a repair line on the substrate crossing the signal line and insulated from the signal line, the repair line being connected with the signal line in the non-image display part when the signal line is repaired;
forming an insulating layer on the substrate including an area where the signal line is formed;
forming a metal layer on the insulating layer;
patterning the metal layer to form a first redundancy conductive pattern on the insulating layer, the first redundancy conductive pattern insulated from the signal line and the repair line on a first region of the substrate so that a portion of the first redundancy conductive pattern is overlapped with at least one of the signal line and the repair line, wherein the repair line has a width in an area where the repair line crosses the signal line narrower than a width in an area where the repair line does not cross the signal line; and
repairing the signal line whereby the signal line and the repair line are electrically connected to the first redundancy conductive pattern at the first region.

* * * * *